(12) United States Patent
Seo et al.

(10) Patent No.: US 11,562,294 B2
(45) Date of Patent: Jan. 24, 2023

(54) APPARATUS AND METHOD FOR ANALYZING TIME-SERIES DATA BASED ON MACHINE LEARNING

(71) Applicant: SAMSUNG SDS CO., LTD., Seoul (KR)

(72) Inventors: Ji-Hyeon Seo, Seoul (KR); Jeong-Hyung Park, Seoul (KR); Wang-Geun Park, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 610 days.

(21) Appl. No.: 16/670,185

(22) Filed: Oct. 31, 2019

(65) Prior Publication Data

US 2020/0380409 A1 Dec. 3, 2020

Related U.S. Application Data

(60) Provisional application No. 62/853,757, filed on May 29, 2019.

(30) Foreign Application Priority Data

May 29, 2019 (KR) .......................... 10-2019-0062881

(51) Int. Cl.
*G06N 20/00* (2019.01)
*G06K 9/62* (2022.01)
*G06N 3/04* (2006.01)
*G06N 5/04* (2006.01)
*G06K 9/00* (2022.01)

(52) U.S. Cl.
CPC .......... *G06N 20/00* (2019.01); *G06K 9/6256* (2013.01); *G06K 9/6267* (2013.01); *G06N 5/04* (2013.01)

(58) Field of Classification Search
CPC ........ G06N 20/00; G06N 5/04; G06N 3/0445; G06N 3/0454; G06K 9/6256; G06K 9/6267; G06K 9/6271; G06V 10/82
See application file for complete search history.

(56) References Cited

U.S. PATENT DOCUMENTS 10,503,970 B1 * 12/2019 Zhang .................... A61B 5/117
10,825,564 B1 * 11/2020 Zhang .................... G16H 15/00

FOREIGN PATENT DOCUMENTS

KR 10-1919076 B1 11/2018

OTHER PUBLICATIONS

Zhicheng Cui et al: "Multi-Scale Convolutional Neural Networks for Time Series Classification", pp. 1-10, XP055729755. (Year: 2016).*

(Continued)

*Primary Examiner* — Asghar H Bilgrami
(74) *Attorney, Agent, or Firm* — The PL Law Group, PLLC

(57) ABSTRACT

An apparatus and method for analyzing time series data on the basis of machine learning are provided. According to the disclosed embodiments, it is possible to effectively augment time series data, which is a target to be learned, according to characteristics of the time series data, thereby solving a problem of overfitting a machine learning model due to limited training data and a problem of deterioration of prediction accuracy due to imbalance of distribution of time series data and improving reliability of time series data analysis. In addition, according to the disclosed embodiments, it is possible to effectively set an optimal parameter for augmenting time series data.

14 Claims, 15 Drawing Sheets

| STORE CODE | ITEM | WEEK NUMBER | HOLIDAY | QUANTITY DEMANDED |
|---|---|---|---|---|
| 3454064 | TV01 | 1 | 0 | 0 |
| 3454064 | TV01 | 2 | 0 | 0 |
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |
| 3454064 | TV01 | 10 | 0 | 0 |
| 3454064 | TV01 | 11 | 0.2 | 1 |

(56) References Cited

OTHER PUBLICATIONS

European Search Report for EP 20167958.6 dated Sep. 23, 2020 from European patent office in a counterpart European patent application.

Zhicheng Cui et al., "Multi-Scale Convolutional Neural Networks for Time Series Classification", 2016, XP055729755, Retrieved from the Internet: URL:https://arxiv.org/pdf/1603.06995 pdf.

Stephanie Ger et al., "Autoencoders and Generative Adversarial Networks for Imbalanced Sequence Classification", arxiv.org., Cornell University Library. 2010LIN Library Cornell University Ithaca. NY 14853, 2019, XP081510263.

Terrance Devries et al., "Dataset Augmentation in Feature Space", arxiv.org., Cornell University Library. 2010LIN Library Cornell University Ithaca. NY14853, 2017, XP080747551.

* cited by examiner

FIG. 1

| STORE CODE | ITEM | WEEK NUMBER | HOLIDAY | QUANTITY DEMANDED |
|---|---|---|---|---|
| 3454064 | TV01 | 1 | 0 | 0 |
| 3454064 | TV01 | 2 | 0 | 0 |
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |
| 3454064 | TV01 | 10 | 0 | 0 |
| 3454064 | TV01 | 11 | 0.2 | 1 |

FIG. 3A

| STORE CODE | ITEM | WEEK NUMBER | HOLIDAY | QUANTITY DEMANDED |
|---|---|---|---|---|
| 3454064 | TV01 | 1 | 0 | 0 |
| 3454064 | TV01 | 2 | 0 | 0 |
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |

FIG. 3B

| STORE CODE | ITEM | WEEK NUMBER | HOLIDAY | QUANTITY DEMANDED |
|---|---|---|---|---|
| 3454064 | TV01 | 2 | 0 | 0 |
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |

FIG. 3C

| STORE CODE | ITEM | WEEK NUMBER | HOLIDAY | QUANTITY DEMANDED |
|---|---|---|---|---|
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |
| 3454064 | TV01 | 10 | 0 | 0 |

FIG. 3D

| STORE CODE | ITEM | WEEK NUMBER | HOLIDAY | QUANTITY DEMANDED |
|---|---|---|---|---|
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |
| 3454064 | TV01 | 10 | 0 | 0 |
| 3454064 | TV01 | 11 | 0.2 | 1 |

FIG. 4A

| STORE CODE | ITEM | WEEK NUMBER | HOLIDAY | QUANTITY DEMANDED |
|---|---|---|---|---|
| 3454064 | TV01 | 1 | 0 | 0 |
| 3454064 | TV01 | 2 | 0 | 0 |
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |

FIG. 4B

| STORE CODE | ITEM | WEEK NUMBER | HOLIDAY | QUANTITY DEMANDED |
|---|---|---|---|---|
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |
| 3454064 | TV01 | 10 | 0 | 0 |
| 3454064 | TV01 | 11 | 0.2 | 1 |

FIG. 4C

| STORE CODE | ITEM | WEEK NUMBER | HOLIDAY | QUANTITY DEMANDED |
|---|---|---|---|---|
| 3454064 | TV01 | 2 | 0 | 0 |
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |
| 3454064 | TV01 | 10 | 0 | 0 |
| 3454064 | TV01 | 11 | 0.2 | 1 |

FIG. 4D

| STORE CODE | ITEM | WEEK NUMBER | HOLIDAY | QUANTITY DEMANDED |
|---|---|---|---|---|
| 3454064 | TV01 | 1 | 0 | 0 |
| 3454064 | TV01 | 2 | 0 | 0 |
| 3454064 | TV01 | 3 | 0.3 | 3 |
| 3454064 | TV01 | 4 | 0 | 0 |
| 3454064 | TV01 | 5 | 0.4 | 0 |
| 3454064 | TV01 | 6 | 0.4 | 0 |
| 3454064 | TV01 | 7 | 0 | 0 |
| 3454064 | TV01 | 8 | 0.8 | 1 |
| 3454064 | TV01 | 9 | 0 | 2 |
| 3454064 | TV01 | 10 | 0 | 0 |
| 3454064 | TV01 | 11 | 0.2 | 1 |

APPARATUS AND METHOD FOR ANALYZING TIME-SERIES DATA BASED ON MACHINE LEARNING

CROSS-REFERENCE TO RELATED APPLICATION(S)

This application claims the benefit under 35 USC § 119(a) of US Provisional Patent Application No. 62/853,757 filed on May 29, 2019 and Korean Patent Application No. 10-2019-0062881 filed on May 29, 2019 in the Korean Intellectual Property Office, the entire disclosure of which is incorporated herein by reference for all purposes.

BACKGROUND

1. Field

The following description relates to time series data analysis based on machine learning.

2. Description of Related Art

Time series data refers to data collected over time. Examples of time series data may include product demand quantity data for a certain period of time, anomaly detection data of an IoT device or the like, log data, and the like. Time series data analysis is widely utilized in all fields in which data associated with a concept of time are collected and analyzed, such as demand forecast, anomaly detection, log analysis, and the like.

Recently, machine learning has been increasingly used in time series data analysis. In order to improve accuracy of machine learning, a large amount of training data is required. However, imbalance in data distribution often occurs in time series data. For example, in the case of fault log data, normal data is collected in most of the cases, except for a very small number of fault data, and thus even when there is a large amount of data collected, the amount of fault log data necessary to predict failure is often insufficient.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a technical means for effectively performing augmentation of time series data to be learned in time series data analysis based on machine learning.

In one general aspect, there is provided an apparatus for analyzing time series data including a training data generation module configured to generate one or more pieces of training data by extracting a predetermined length of time period from raw time series data which includes one or more columns and a plurality of observations measured for the columns at consistent time intervals; a first data augmentation module configured to, when a target value of the generated training data satisfies a specific condition, further generate one or more pieces of training data which have the same target value as the target value but have a different length of time period to be extracted; a feature extractor configured to receive the training data and extract one or more feature values from the training data; and a classifier configured to classify the training data on the basis of the one or more extracted feature values.

The apparatus may further include a second data augmentation module configured to augment one or more of the training data and the feature values according to a characteristic of the column.

When the columns include one or more numeric columns, the second data augmentation module may augment one or more pieces of training data by applying a predetermined data augmentation scheme to observations that correspond to the numeric columns of the generated training data, and the feature extractor may receive the augmented training data and extract one or more feature values from the augmented training data.

When the columns include one or more categorical columns, the second data augmentation module may augment one or more feature values by applying a predetermined data augmentation scheme to the one or more feature values extracted by the feature extractor and the classifier may classify the training data on the basis of the augmented feature values.

The apparatus may further include a policy recommendation module configured to determine an optimal data augmentation policy for augmenting one or more of the training data and the feature values.

The policy recommendation module may perform learning by applying a plurality of different data augmentation policies to the training data and the feature values and determine the optimal data augmentation policy by comparing training results for each data augmentation policy.

The policy recommendation module may terminate learning in accordance with a specific data augmentation policy and delete the specific data augmentation policy when a value of loss function increases during a learning process to which the specific data augmentation policy is applied or when a difference between a mean of values of the loss function during a specific past period and a current value of loss function is smaller than a set threshold.

In another general aspect, there is provided a method of analyzing time series data, which is performed by a computing device comprising one or more processors and a memory in which one or more programs to be executed by the one or more processors are stored, the method including generating one or more pieces of training data by extracting a predetermined length of time period from raw time series data which includes one or more columns and a plurality of observations measured for the columns at consistent time intervals; when a target value of the generated training data satisfies a specific condition, further generating one or more pieces of training data which have the same target value as the target value but have a different length of time period to be extracted; receiving the training data and extracting one or more feature values from the training data; and classifying the training data on the basis of the one or more extracted feature values.

The method may further include augmenting one or more of the training data and the feature values according to a characteristic of the column.

When the columns include one or more numeric columns, the augmenting may include augmenting the one or more pieces of training data by applying a predetermined data augmentation scheme to observations that correspond to the numeric columns of the generated training data, and the extracting of the one or more feature values may include receiving the augmented training data and extracting the one or more feature values from the augmented training data.

When the columns include one or more categorical columns, the augmenting may include augmenting the one or more feature values by applying a predetermined data augmentation scheme to the one or more extracted feature values and the classifying may include classifying the training data on the basis of the augmented feature values.

The method may further include determining an optimal data augmentation policy for augmenting one or more of the training data and the feature values.

The determining of the optimal data augmentation policy may include performing learning by applying a plurality of different data augmentation policies to the training data and the feature values and determining the optimal data augmentation policy by comparing training results for each data augmentation policy.

The determining of the optimal data augmentation policy may include terminating learning in accordance with a specific data augmentation policy and deleting the specific data augmentation policy when a value of loss function increases during a learning process to which the specific data augmentation policy is applied or when a difference between a mean of values of the loss function during a specific past period and a current value of loss function is smaller than a set threshold.

Other features and aspects will be apparent from the following detailed description, the drawings, and the claims.

BRIEF DESCRIPTION OF THE DRAWINGS

FIG. 1 is a table for describing time series data used in disclosed embodiments.

FIGS. 3A to 3D show tables for describing an example in which a training data generation module generates training data according to one embodiment.

FIGS. 4A to 4D shows tables for describing an example in which a first data augmentation module further generates training data according to one embodiment.

Figure 2:
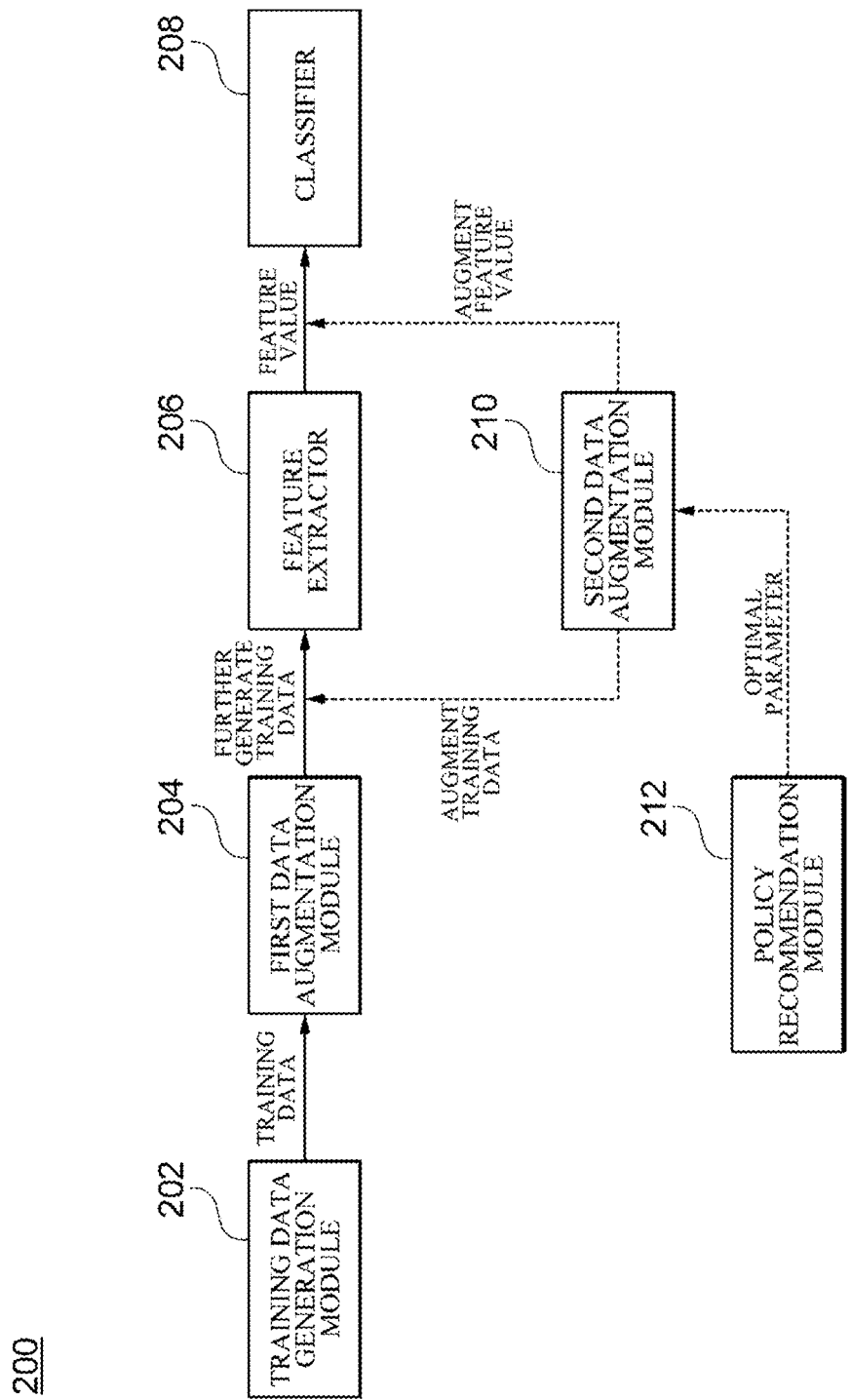
FIG. 2 is a block diagram for describing an apparatus for analyzing time series data according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a table for describing time series data used in disclosed embodiments. Time series data refers to data that has a temporal order, such as sensor data, sales data, and the like. The time series data includes one or more columns and a plurality of observations measured for the columns at consistent time intervals. FIG. 1 illustrates weekly demand data for an arbitrary product. In the time series data shown in FIG. 1, columns represent "store code", "item", "week number", "holiday", and "quantity demanded."

Unlike data whose value can be expressed numerically, such as image or voice data, each column of the time series data may be classified into a numerical column and a categorical column. For example, in the time series data shown in FIG. 1, "store code", "item", and "week number" are categorical columns and "holiday", and "quantity demanded" are numeric columns. For reference, the column of "holiday" in the shown time series data represents a ratio of holidays occupying a corresponding week. Slight numerical changes in values corresponding to the numeric columns may not cause a significant change in the meaning of data. For example, when quantity demanded in a specific week is changed from 100 to 101 or to 99, such a change does not significantly affect the trend of the whole data. However, in the case of a value corresponding to the categorical column, the meaning of the value may completely change according to the numerical change in the value. For example, when assuming that store code is assigned 1, 2, 3, or the like according to the store, change of the store code from 100 to 101 or to 99 results in the change of the store itself. Therefore, in the case of time series data, it is necessary to distinguish between the numeric columns and the categorical columns in processing data.

In the disclosed embodiments, time series data is learned via a machine leaning model, for example, a deep neural network, to generate a prediction model. If time series data to be learned are distributed uniformly and there is a large amount of data, a prediction model with high prediction accuracy may be generated. However, data observed in the real world often follow a nonnormal distribution in which data is excessively biased to specific values, and the amount of data is mostly insufficient. For example, in the case of demand quantity data for a product for which demand occurs irregularly, data is excessively biased to 0 since the quantity demanded is mostly 0 except for a section where the demand occurs. When a demand forecasting model is trained with such data, a model that predicts most of the results as 0 is generated. In addition, in the case of anomaly detection data, most of the sensor data correspond to a normal section and data corresponding to a faulty section are very few, and thus it is difficult to collect data having characteristics related to the faulty section.

FIG. 2 is a block diagram for describing an apparatus 200 for analyzing time series data according to one embodiment. The apparatus 200 for analyzing time series data according to one embodiment refers to an apparatus for learning time series data and performing a prediction on what will happen in the future. For example, in a case where the time series data is sales data with respect to a specific product sold during a predetermined period, the apparatus 200 for analyzing time series data may predict a future sales amount by learning a past sales history for the corresponding product. In another example, in a case where the time series data is sensor data measured by a specific device, the apparatus 200 for analyzing time series data may predict a future failure of the corresponding device by analyzing the sensor data obtained for a certain period of time.

As shown in FIG. 2, the apparatus 200 for analyzing time series data according to one embodiment includes a training data generation module 202, a first data augmentation module 204, a feature extractor 206, and a classifier 208.

The training data generation module 202 generates one or more pieces of training data by extracting a predetermined length of time period from raw time series data. As described above, the raw time series data may include one or more columns and a plurality of observations (rows) measured for the columns at consistent time intervals.

FIGS. 3A to 3D show tables for describing an example in which the training data generation module 202 generates training data according to one embodiment. Specifically, FIGS. 3A to 3D show an example in which training data is generated from the raw time series data shown in FIG. 1, that is, demand quantity data recorded for each successive week with respect to the same store and the same item.

As shown in FIG. 1, when there is demand quantity data recorded for 11 weeks with respect to the same store and the same item, it is assumed that after observing consecutive input data for 7 weeks from a starting week, training data for predicting a quantity demanded in the following week as a target value is generated. Then, the training data generation module 202 may generate 4 pieces of training data as shown in FIGS. 3A to 3D from the raw data of FIG. 1. Specifically, FIG. 3A shows training data for predicting a quantity demanded in week 8 from the quantities demanded from week 1 to week 7, FIG. 3B shows training data for predicting a quantity demanded in week 9 from quantities demanded from week 2 to week 8, FIG. 3C shows training data for predicting a quantity demanded in week 10 from quantities demanded from week 3 to week 9, and FIG. 3D shows training data for predicting a quantity demanded in week 11 from quantities demanded from week 4 to week 10.

When the target value of the training data generated by the training data generation module 202 meets a specific condition, the first data augmentation module 204 further generates one or more pieces of training data which have the same target value as said target value but have a different length of time period to be extracted.

FIGS. 4A to 4D show tables for describing an example in which the first data augmentation module 204 further generates training data according to one embodiment. Specifically, FIGS. 4A to 4D show an example in which training data is further generated from the raw time series data shown in FIG. 1, that is, the demand quantity data recorded for each successive week with respect to the same store and the same item.

For example, it is assumed that training data is further generated for a specific week in which a target value (quantity demanded) is greater than or equal to 1 in the raw time series data shown in FIG. 1. Then, the first data augmentation module 204 may further generate training data for week 8, week 9, and week 11, in which the quantity demanded is greater than or equal to 1, by changing the length of time period to be extracted from 7 weeks to 8 weeks, 9 weeks, or 10 weeks. Specifically, FIG. 4A shows training data for predicting a quantity demanded in week 9 from the quantities demanded from week 1 to week 8, FIG. 4B shows training data for predicting a quantity demanded in week 11 from quantities demanded from week 3 to week 10, FIG. 4C shows training data for predicting a quantity demanded in week 11 from quantities demanded from week 2 to week 10, and FIG. 4D shows training data for predicting a quantity demanded in week 11 from quantities demanded from week 1 to week 10.

As such, when the target value satisfies a specific condition, the first data augmentation module 204 may further generate training data by varying the length of time period to be extracted so that an overfitting problem due to imbalance of data distribution that the time series data may have can be alleviated. In the aforementioned example, training data is further generated only for a case in which a target quantity demanded is greater than or equal to 1, so that training data in which the quantity demanded is greater than or equal to 1 can be further secured for a case of time series in which most of the quantities demanded are 0. Particularly, a deep neural network in a recurrent neural network (RNN) family suitable for pattern learning of order (temporal relevance) information may learn data having a variable time length as an input, and hence observation time of input data may be variously generated and utilized.

Then, the feature extractor 206 may receive the training data and extracts one or more feature values from the training data. The feature extractor 206 removes unnecessary information by stepwise filtering and/or extracting information of the input training data, extracts features that are important and have information, and provides the features as inputs of the classifier 208. In the disclosed embodiments, the feature extractor 206 may use ca convolutional neural network (CNN), RNN, a fully connected network (FNC), and the like according to features of the time series data.

The classifier 208 classifies the training data on the basis of one or more extracted feature values. Since the time series data requires a pattern analysis on a temporal order, the classifier 208 may learn the order pattern by inputting the feature value extracted for each time by the feature extractor 206 into an RNN or a bi-directional recurrent neural network (BRNN). Also, the classifier 208 may configure a model that classifies feature vectors, which are extracted by learning about a feature axis and a time axis, according to a class via a FNC or predicts the feature vectors as a single value.

Meanwhile, the apparatus 200 for analyzing time series data according to one embodiment may further include a second data augmentation module 210. The second data augmentation module 210 may augment one or more of the training data and the feature value according to features of each column of the time series data. Specifically, in a case where a numerical column is included in the columns of the time series data, the second data augmentation module 210 according to one embodiment may augment the training data by applying a predetermined data augmentation scheme to an observation in the generated training data which corresponds to the numerical column. Then, the feature extractor 206 may receive the augmented training data and extract one or more feature values from the training data. Hereinafter, such augmentation of a numerical column of training data will be referred to as "raw space augmentation."

In addition, in a case where a categorical column is included in the columns of the time series data, the second data augmentation module 210 may augment the feature values by applying a predetermined data augmentation scheme to the one or more feature values extracted by the feature extractor 206. Then, the classifier 208 may classify the training data on the basis of the augmented feature values. Hereinafter, the augmentation of an output value of the feature extractor 206 will be referred to as "feature space augmentation."

Hereinafter, the raw space augmentation and the feature space augmentation will be described in more detail.

Raw Space Augmentation

Raw space augmentation is one of data augmentation schemes and is a method of generating similar training data by modifying training data. For example, in the case of voice data, training data may be augmented by changing the form of voice, such as slowing down the speed of voice or changing the pitch of voice, without changing the meaning of the voice data.

As described above, the time series data consists of numeric columns and categorical columns, and in the case of the categorical columns, the meaning of data can be significantly changed even with a slight change in value. Therefore, in the disclosed embodiments, the second data augmentation module 210 may apply additional training data from previously generated training data by utilizing various schemes, such as applying a slight noise to the numeric columns by applying raw space augmentation only to the numeric columns of the time series data, or making a slight change in the time series trend.

When the raw space augmentation is applied to the time series data consisting of numeric columns and categorical columns, new training data may be generated by utilizing various time series data augmentation schemes, such as applying a slight noise only to the numeric columns or making a slight change in the time series trend.

Figure 5:
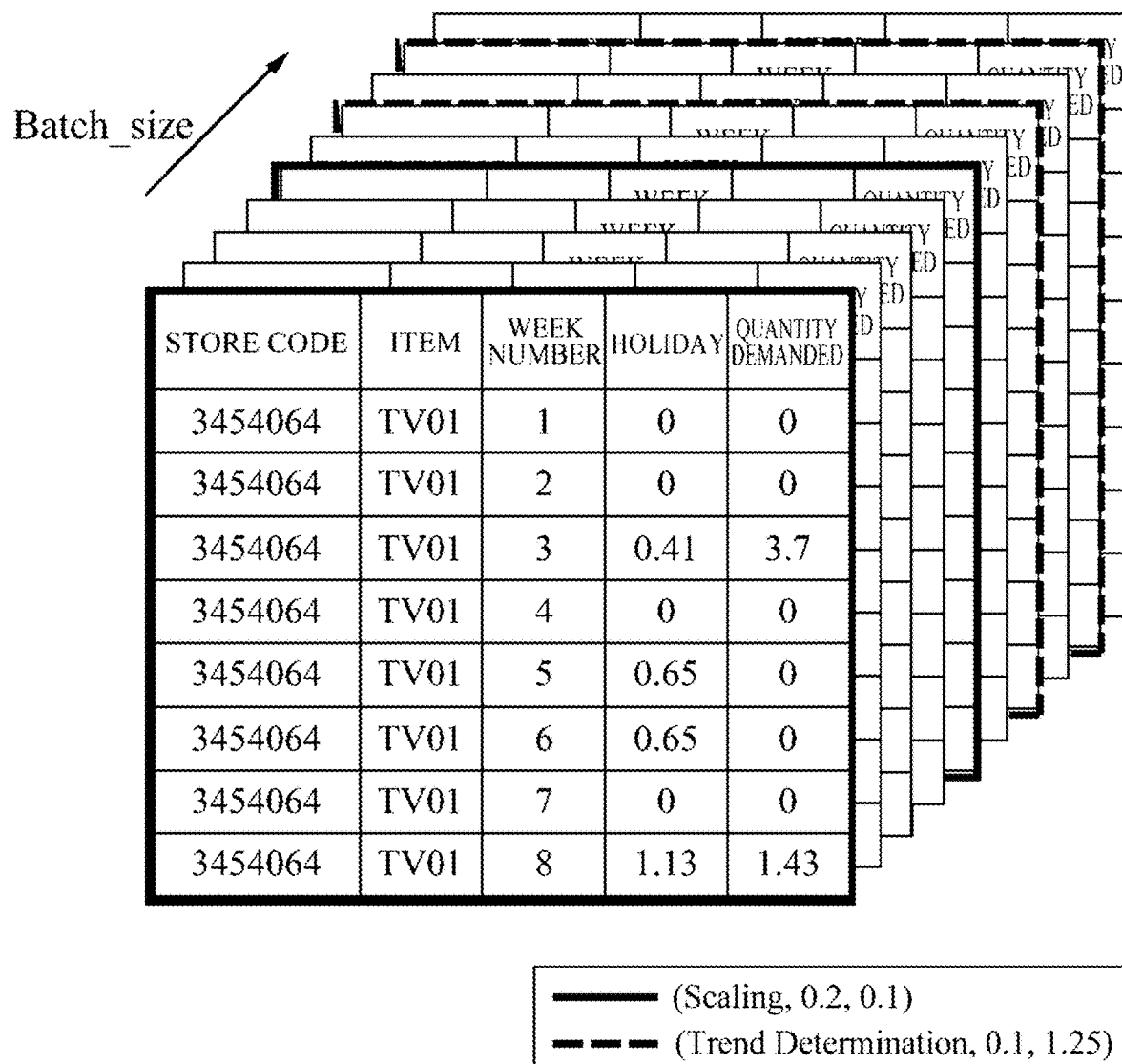
FIG. 5 is a diagram for describing an example in which a second data augmentation module applies raw space augmentation to training data according to one embodiment.

FIG. 5 is a diagram for describing an example in which the second data augmentation module 210 applies raw space augmentation to training data according to one embodiment. For example, the second data augmentation module 210 may apply a scaling scheme to some training data in the same batch and apply a trend determination scheme to some other training data, thereby effectively amplifying the training data. In the disclosed embodiments, the batch of the training data refers to a group of training data that is processed at a time at the time of learning a model. The second data augmentation module 210 may be configured to apply various augmentation schemes and augmentation ratios for each batch of the training data such that the feature extractor 206 and the classifier 208 can effectively learn various forms of the training data.

A data augmentation policy necessary for the second data augmentation module 210 to apply raw space augmentation to training data may include as follows:

"Augmentation scheme" refers to an augmentation scheme to be applied to training data. For example, the augmentation scheme may include scaling, jittering, trend determination, magnitude warp, and the like.

"Augmentation application ratio" refers to a ratio of training data to which an augmentation scheme is applied. "Parameter" refers to parameters related to a set augmentation scheme.

Feature Space Augmentation

As described above, in the case of raw space augmentation, training data can be augmented only for numerical data in time series data columns and augmentation for categorical columns changes the meaning of data itself, and hence the raw space augmentation cannot be applied. Accordingly, the second data augmentation module 210 applies a data augmentation scheme not to training data itself but to the output values of the feature extractor 206, that is, the feature values generated from the training data, in order to increase the amount of training data of a data set including a categorical column.

The feature value data extracted by the feature extractor 206 is a vector that numerically expresses important information having characteristics of input values as a numerical value, and may be considered sufficiently representative of the learning data. Thus, data augmentation for such a feature value may produce an effect similar to that of augmentation of training data.

Figure 6:
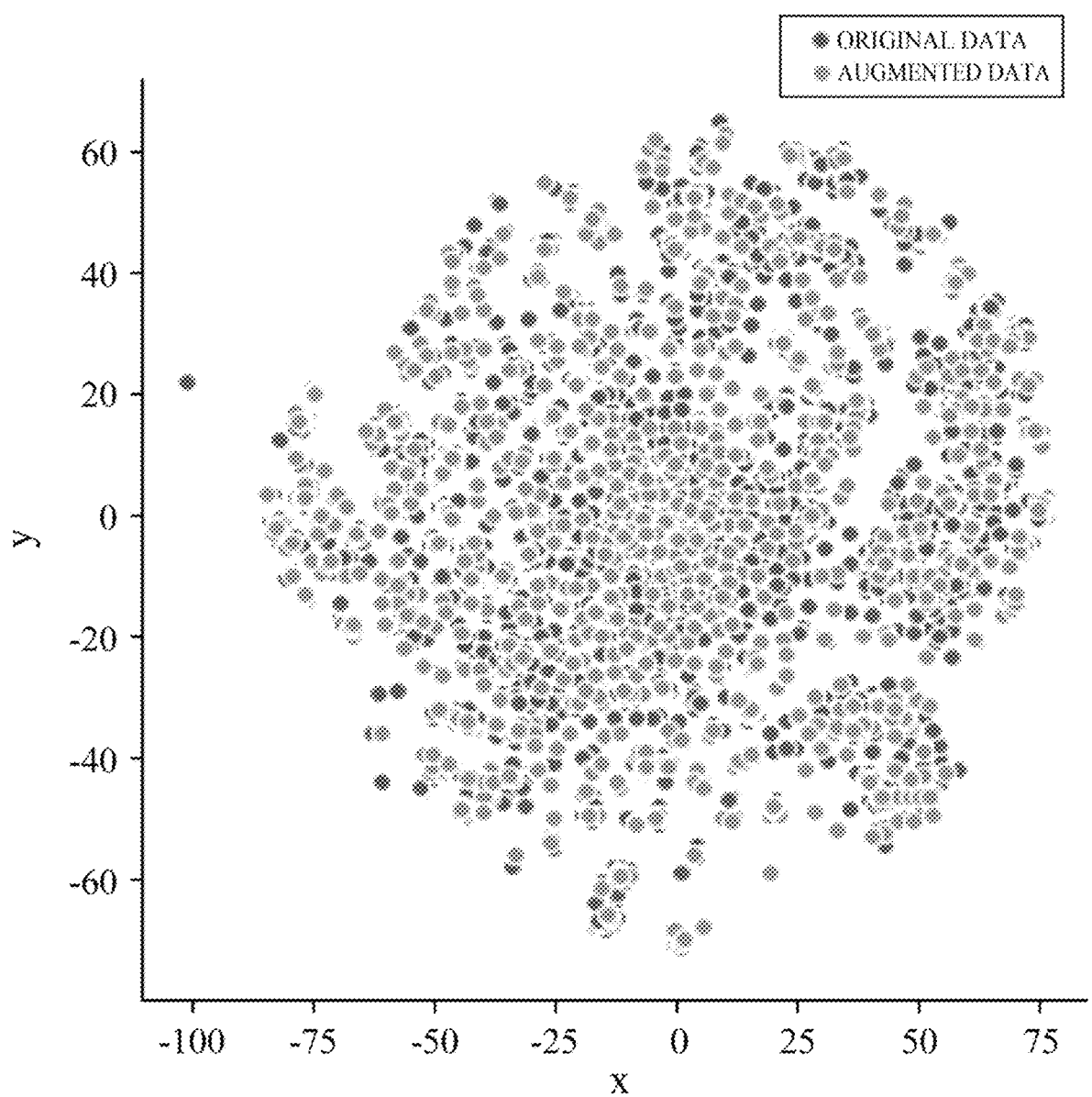
FIG. 6 is a graph for describing an example in which the second augmentation module applies feature space augmentation to a feature value according to one embodiment.

FIG. 6 is a graph for describing an example in which the second augmentation module 210 applies feature space augmentation to a feature value according to one embodiment. For convenience of description, in FIG. 6, each feature vector is illustrated as having two dimensions, but dimensions of the feature vector may vary according to the training data and a learning model.

In the graph shown in FIG. 6, blue dots denote feature values to which an augmentation scheme is not applied and orange dots denote feature values to which the augmentation scheme is applied. The feature values to which the augmentation scheme is applied are present in a similar space to that of an original feature value, and thus the augmented feature values may be considered to have similar characteristics to those of the original feature value.

A data augmentation policy necessary for the second data augmentation module 210 to apply feature space augmentation to training data may be constructed the same as the raw space augmentation.

Meanwhile, the apparatus 200 for analyzing time series data may further include a policy recommendation module 212. The policy recommendation module 212 according to one embodiment may determine an optimal data augmentation policy for augmenting one or more of the training data and the feature values.

As described above, when the data augmentation scheme is applied to the training data or the feature value, better learning result can be achieved as compared to a case where the data augmentation is not applied. However, time series data which is a target to be learned has various characteristics, and thus it is inefficient to apply the same augmentation scheme to all time series data. Therefore, the apparatus 200 for analyzing time series data may be configured to determine which data augmentation policy is the most effective for the time series data to be learned and recommend an optimal data augmentation policy. As described above, the data augmentation scheme may include an augmentation scheme, an augmentation application ratio, parameters, and the like.

In one embodiment, the policy recommendation module 212 may perform learning by applying a plurality of different data augmentation schemes to the training data and the feature values and determine the optimal data augmentation policy by comparing the learning results for each data augmentation policy.

Figure 7:
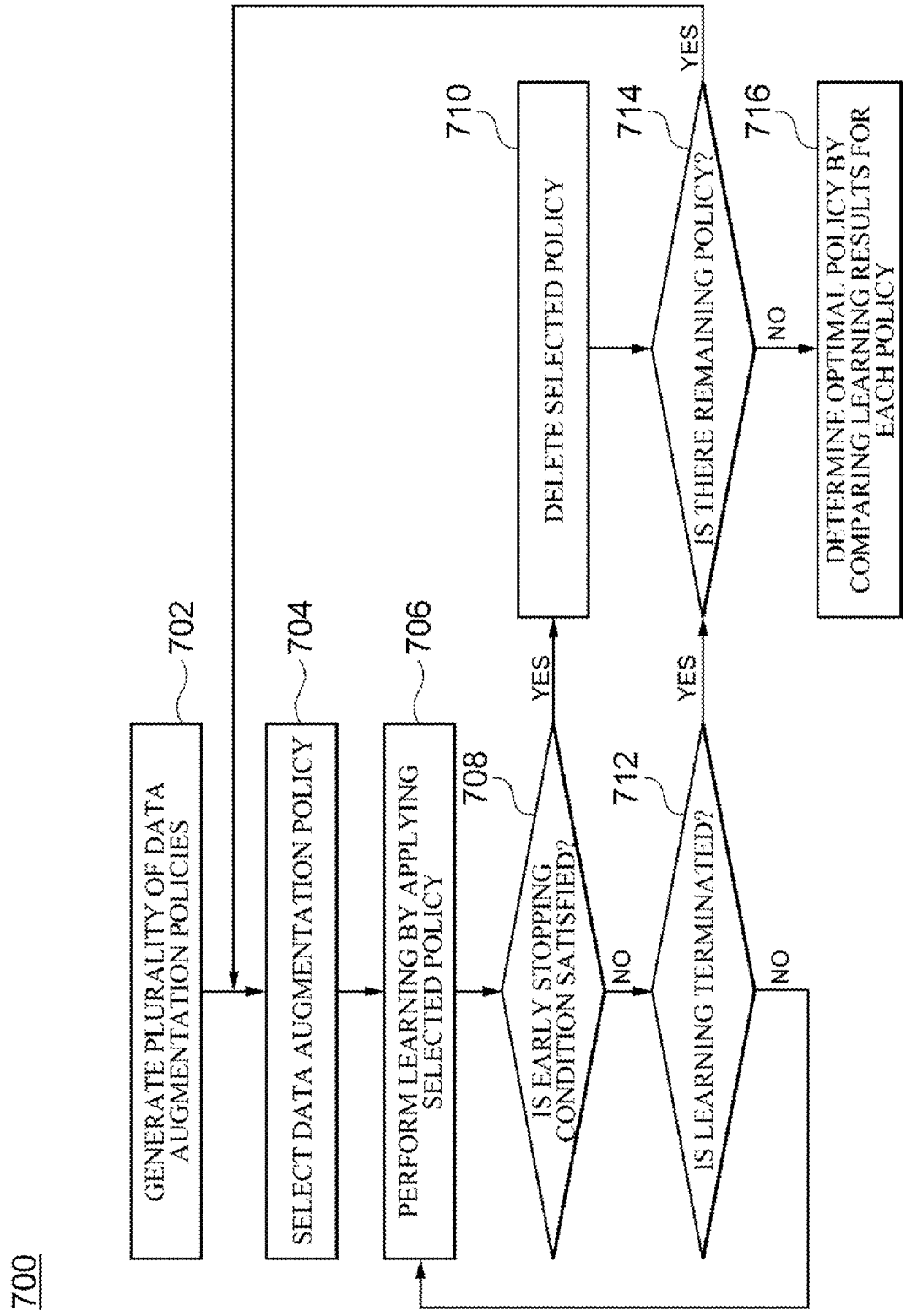
FIG. 7 is a flowchart illustrating a process of determining an optimal data augmentation policy in a policy recommendation module according to one embodiment.

FIG. 7 is a flowchart illustrating a process of determining an optimal data augmentation policy in the policy recommendation module 212 according to one embodiment. In the illustrated flowchart, raw space augmentation or feature space augmentation may be equally applied.

In operation 702, the policy recommendation module 212 generates a plurality of data augmentation policies to be applied to raw space augmentation or feature space augmentation. In this case, the policy recommendation module 212 may receive the data augmentation policies from a user or randomly generate the data augmentation policies.

In operation 704, the policy recommendation module 212 selects one from the generated data augmentation policies.

In operation 706, the policy recommendation module 212 performs model learning by applying the selected policy to training data.

In operation 708, the policy recommendation module 212 periodically determines whether the learning result corresponds to an early stopping condition during the learning of the model. In one embodiment, the policy recommendation module 212 may determine that the learning result corresponds to the early stopping condition when a value of loss function increases during the learning process in accordance with the selected policy or when a difference between the mean of values of the loss function within a specific past period and the current value of loss function is smaller than a set threshold. Specifically, the early stopping condition may be expressed as follows:

$$\frac{1}{2}(loss_{t-1} - loss_t) < 0 \quad \text{[Condition 1]}$$

$$\left|\left(\frac{1}{k}\sum_{i=t-k}^{t-1} loss_i\right) - loss_t\right| < threshold \quad \text{[Condition 2]}$$

These conditions will be described in more detail as follows.

Condition 1 represents a case where $loss_t$ which is a value of loss function at time t becomes greater than $loss_{t-1}$ which is a value of loss function at time t−1. A greater loss than a previous point in time may mean that learning is not performed. Condition 2 represents a case where a difference between $loss_t$ at time t and the mean value of loss functions during a past period (t−k to t−1) from time t is smaller than a set threshold. In this case, the length k of the past period and the threshold may be appropriately set by taking into account characteristics of the time series data.

When it is determined in operation 708 that the early stopping condition is satisfied, in operation 710, the policy recommendation module 212 may delete the policy selected in operation 704. That is, when one or both of the above conditions 1 and 2 are applied and satisfied, the policy recommendation module 212 may determine that learning is no longer performed properly and may terminate the learning early. As such, when the separate early stopping condition is used, unnecessary computation may be reduced and efficiency of an optimal policy determination process may be improved.

By contrast, when it is determined in operation 708 that the early stopping condition is not satisfied, in operation 712, the policy recommendation module 212 determines whether the learning in accordance with the corresponding policy is terminated.

When it is determined in operation 712 that the learning is not terminated, the policy recommendation module 212 returns back to operation 706 and continues to perform learning.

In contrast, when it is determined in operation 712 that the learning is terminated, or when the policy is deleted according to the early stopping condition in operation 710, in operation 714, the policy recommendation module 212 determines whether there are remaining data augmentation policies.

When it is determined in operation 714 that there are remaining policies, the policy recommendation module 212 returns back to operation 704 and selects one from the remaining data augmentation policies.

In contrast, when it is determined in operation 714 that there is no remaining policy, the policy recommendation module 212 determines an optimal policy by comparing the learning results for each policy.

Figure 8:
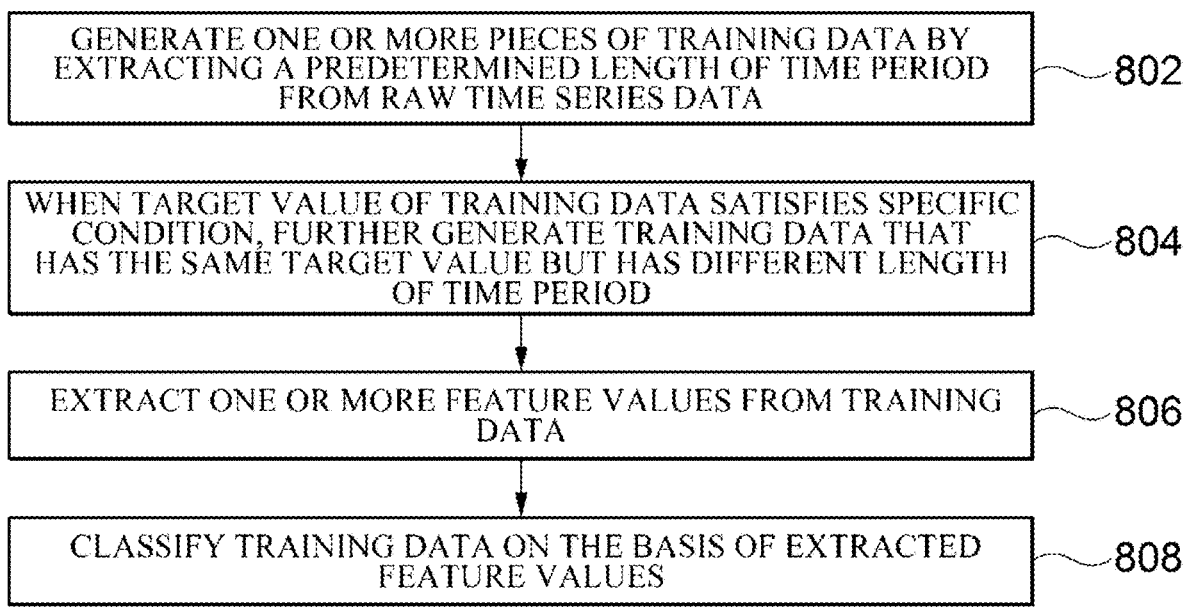
FIG. 8 is a flowchart for describing a method of analyzing time series data according to one embodiment.

FIG. 8 is a flowchart for describing a method 800 of analyzing time series data according to one embodiment. The illustrated flowchart may be performed by a computing device which includes one or more processors and a memory in which one or more programs to be executed by the one or more processors, for example, the above-described apparatus 200 for analyzing time series data. In the illustrated flowchart, the method or process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 802, the training data generation module 202 of the apparatus 200 for analyzing time series data generates one or more pieces of training data by extracting a predetermined length of time period from raw time series data that includes one or more columns and a plurality of observations measured for the columns at consistent time intervals.

In operation 804, when a target value of the generated training data satisfies a specific condition, the first data augmentation module 204 of the apparatus 200 for analyzing time series data further generates one or more pieces of training data which have the same target value as the target value of the previously generated training data but have a different length of time period to be extracted.

In operation 806, the feature extractor 206 of the apparatus 200 for analyzing time series data receives the training data and extracts one or more feature values from the training data.

In operation 808, the classifier 208 of the apparatus 200 for analyzing time series data classifies the training data on the basis of the one or more extracted feature values.

Figure 9:
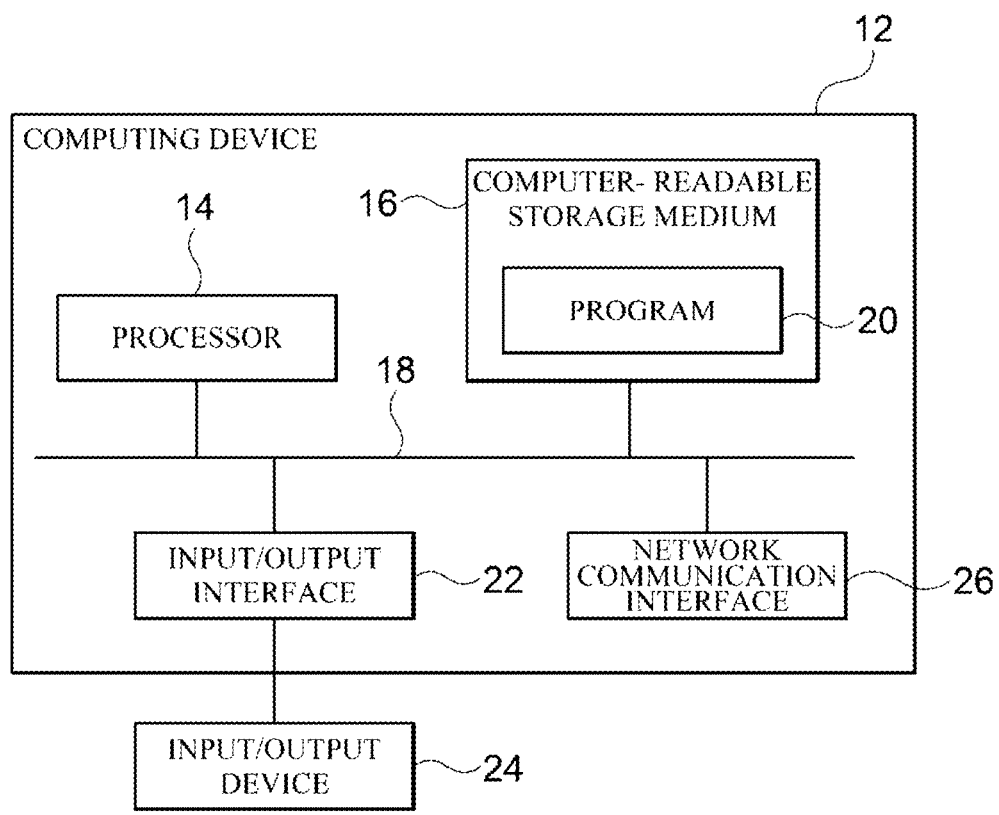
FIG. 9 is a block diagram for describing a computing environment including a computing device suitable to be used in exemplary embodiments.

FIG. 9 is a block diagram for describing a computing environment including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be the apparatus 200 for analyzing time series data according to embodiments of the present disclosure.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer readable storage medium 16 is configured to store computer executable commands and program codes, program data and/or information in other suitable forms. The program 20 stored in the computer readable storage medium 16 may include a set of commands executable by the processor 14. In one embodiment, the computer readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

According to the disclosed embodiments, it is possible to effectively augment time series data, which is a target to be learned, according to characteristics of the time series data, thereby solving a problem of overfitting a machine learning model due to limited training data and a problem of deterioration of prediction accuracy due to imbalance of distribution of time series data and improving reliability of time series data analysis.

In addition, according to the disclosed embodiments, it is possible to effectively set an optimal parameter for augmenting time series data.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for analyzing time series data, comprising:
a training data generation module configured to generate one or more pieces of a first training data by extracting a predetermined length of time period from raw time series data which comprises one or more columns and a plurality of observations measured for the one or more columns at consistent time intervals;
a first data augmentation module configured to, when a target value for predicting from the observations of the first training data satisfies a specific condition, generate a first augmented training data by further generating one or more pieces of a second training data which have the same target value as the target value but have a different length of time period to be extracted from the predetermined length of time, wherein the first augmented training data includes the first training data and the second training data;
a feature extractor configured to receive the first augmented training data and extract one or more feature values from the first augmented training data; and
a classifier configured to classify the first augmented training data on the basis of the one or more extracted feature values.

2. The apparatus of claim 1, further comprising a second data augmentation module configured to augment one or more of the first augmented training data and the feature values according to a characteristic of the one or more columns.

3. The apparatus of claim 2, wherein when the one or more columns comprise one or more numeric columns, the second data augmentation module is further configured to generate a second augmented training data by augmenting one or more pieces of training data by applying a predetermined data augmentation scheme to observations that correspond to the numeric columns of the first augmented training data, and the feature extractor is further configured to receive the second augmented training data and extract one or more feature values from the second augmented training data.

4. The apparatus of claim 2, wherein when the one or more columns comprise one or more categorical columns, the second data augmentation module is further configured to generate a second augmented training data by augmenting one or more feature values by applying a predetermined data augmentation scheme to the one or more feature values extracted by the feature extractor and the classifier is further configured to classify the second augmented training data on the basis of the augmented feature values.

5. The apparatus of claim 2, further comprising a policy recommendation module configured to determine an optimal data augmentation policy for augmenting one or more of the first augmented training data and the feature values.

6. The apparatus of claim 5, wherein the policy recommendation module is further configured to perform learning by applying a plurality of different data augmentation policies to the first augmented training data and the feature values and determine the optimal data augmentation policy by comparing training results for each data augmentation policy.

7. The apparatus of claim 6, wherein the policy recommendation module is further configured to terminate learning in accordance with a specific data augmentation policy and delete the specific data augmentation policy when a value of loss function increases during a learning process to which the specific data augmentation policy is applied or when a difference between a mean of values of the loss function during a specific past period and a current value of loss function is smaller than a set threshold.

8. A method of analyzing time series data, which is performed by a computing device comprising one or more processors and a memory in which one or more programs to be executed by the one or more processors are stored, the method comprising:
generating one or more pieces of a first training data by extracting a predetermined length of time period from raw time series data which comprises one or more columns and a plurality of observations measured for the one or more columns at consistent time intervals;
when a target value for predicting from the observations of the first training data satisfies a specific condition, generating a first augmented training data by further generating one or more pieces of a second training data which have the same target value as the target value but have a different length of time period to be extracted from the predetermined length of time, wherein the first augmented training data includes the first training data and the second training data;
receiving the first augmented training data and extracting one or more feature values from the first augmented training data; and
classifying the first augmented training data on the basis of the one or more extracted feature values.

9. The method of claim 8, further comprising augmenting one or more of the first augmented training data and the feature values according to a characteristic of the columns.

10. The method of claim 9, wherein when the columns comprise one or more numeric columns, the augmenting comprises generating a second augmented training data by augmenting the one or more pieces of the first training data by applying a predetermined data augmentation scheme to observations that correspond to the numeric columns of the first augmented training data, and the extracting of the one or more feature values comprises receiving the second augmented training data and extracting the one or more feature values from the second augmented training data.

11. The method of claim 9, wherein when the columns comprise one or more categorical columns, the augmenting comprises generating a second augmented training data by augmenting the one or more feature values by applying a predetermined data augmentation scheme to the one or more extracted feature values and the classifying comprises classifying the second augmented training data on the basis of the augmented feature values.

12. The method of claim 9, further comprising determining an optimal data augmentation policy for augmenting one or more of the first augmented training data and the feature values.

13. The method of claim 12, wherein the determining of the optimal data augmentation policy comprises performing learning by applying a plurality of different data augmentation policies to the first augmented training data and the feature values and determining the optimal data augmentation policy by comparing training results for each data augmentation policy.

14. The method of claim 12, wherein the determining of the optimal data augmentation policy comprises terminating learning in accordance with a specific data augmentation policy and deleting the specific data augmentation policy when a value of loss function increases during a learning process to which the specific data augmentation policy is applied or when a difference between a mean of values of the loss function during a specific past period and a current value of loss function is smaller than a set threshold.

* * * * *